United States Patent [19]

Saegusa et al.

[11] Patent Number: 5,799,217
[45] Date of Patent: Aug. 25, 1998

[54] BATTERY CHECK DEVICE FOR A CAMERA

[75] Inventors: Takashi Saegusa, Kawasaki; Hisatoshi Fujiwara, Koganei, both of Japan

[73] Assignee: Nikon Corporation, Tokyo, Japan

[21] Appl. No.: 780,718

[22] Filed: Jan. 8, 1997

Related U.S. Application Data

[63] Continuation of Ser. No. 497,168, Jun. 30, 1995, abandoned.

[30] Foreign Application Priority Data

Sep. 7, 1994 [JP] Japan ................................ 6-214039

[51] Int. Cl.[6] ............................................. G03B 17/18
[52] U.S. Cl. ....................................... 396/279; 396/277
[58] Field of Search ................................ 396/277, 279, 396/280, 301

[56] References Cited

U.S. PATENT DOCUMENTS

| | | | |
|---|---|---|---|
| 4,525,055 | 6/1985 | Yokoo | 354/468 |
| 4,547,770 | 10/1985 | Suzuki et al. | 354/468 |
| 4,716,433 | 12/1987 | Alyfuku | 354/468 |
| 4,751,546 | 6/1988 | Yamamoto et al. | 354/468 |
| 4,887,118 | 12/1989 | Gaewsky | 354/484 |
| 4,914,465 | 4/1990 | Saegusa et al. | 354/412 |
| 5,027,150 | 6/1991 | Inoue et al. | 354/484 |
| 5,070,357 | 12/1991 | Kazami et al. | 354/468 |
| 5,081,483 | 1/1992 | Ishimura et al. | 354/468 |
| 5,283,608 | 2/1994 | Goo et al. | 354/468 |
| 5,390,130 | 2/1995 | Watanabe et al. | 354/468 |

*Primary Examiner*—Safet Metjahic
*Assistant Examiner*—Michael Dalakis

[57] ABSTRACT

A battery check device which assesses a state of exhaustion of a battery installed in a camera, and which can accurately assess at any time the state of exhaustion of the battery according to the drive state of a camera mechanism, such as a mirror. The battery check device includes a voltage detection device to detect the voltage of the camera battery, a drive detection device to detect the required time needed to drive the camera mechanism, a memory in which is stored the required time detected by the drive detection device, and a calculating device which inputs the battery voltage detected by the voltage detection device and the required time which has been recorded in the memory, and calculates a degree of exhaustion of the battery corresponding to these values. A display then displays the degree of exhaustion of the battery which has been found by the calculating device.

27 Claims, 6 Drawing Sheets

| BATTERY VOLTAGE Va | REQUIRED TIME Tb → | STANDARD Tb < TIME Tr | STANDARD Tb ≥ TIME Tr |
|---|---|---|---|
| V0 ≤ Va | (POWER SUPPLY INTRODUCTION TIME) | "full" display | "full" display |
| V1 ≤ Va < V0 | | "full" display | "warning" display |
| V2 ≤ Va < V1 | | "warning" display | "warning" display |
| Va < V2 | | "use impossible" display | "use impossible" display |

FIG. 6

BATTERY CHECK DEVICE FOR A CAMERA

This application is a continuation of application Ser. No. 08/497,168, filed Jun. 30, 1995, now abandoned.

BACKGROUND OF THE INVENTION

1. Field of the Invention

The present invention relates to a battery check device for assessing whether a battery power source is exhausted, and, more particularly, the present invention relates to a battery check device for a camera which assesses whether a battery power source is exhausted and displays a warning that the battery power source is exhausted.

2. Description of the Related Art

Cameras and like electrical equipment having built-in battery check devices are known which determine if the battery is adequately charged and inform the operator of the appropriate time to change or charge the battery. To determine the state of exhaustion of a battery (i.e., the extent to which a battery is discharged) with the known type of battery check device, the output voltage of the battery (hereinafter referred to as "the battery voltage") is measured, and the state of exhaustion of the battery is assessed by detecting a fall of the battery voltage.

However, when assessing the degree of exhaustion of a battery with the known battery check devices, the degree of exhaustion of the battery is assessed when a light load is connected to the battery. A problem occurs in that the known devices can not accurately assess the ability of the battery to actually provide electric power when a heavy load is connected to the battery, such as when the battery supplies power to operate a motor, based on the battery voltage when a light load is connected to the battery. More specifically, because the battery voltage temporarily recovers when the battery is under a light load, the known battery check device assesses that the ability of the battery to provide electric power is sufficient, when in actuality the ability of the battery to provide current in this state is low. As a result, when driving a heavy load, such as a motor or the like, a steep fall of the battery voltage results. Accordingly, because the state of the battery assessed by the known battery check device does not correlate accurately with the ability of the battery to actually drive a heavy load such as a motor or the like, the state of exhaustion of the battery can not be accurately assessed.

Further, when using a battery in a low temperature environment, the rate of reaction of the chemicals within the battery becomes slow, and the ability to provide current is markedly reduced. However, because the known battery check devices assess the ability to provide current based on a battery voltage detected under a light load, the reduction in the ability of the battery to provide current as a result of the temperature drop can not be detected, and a drop in performance of the battery can not be accurately assessed.

SUMMARY OF THE INVENTION

It is an object of the present invention to provide a battery check device which can accurately assess the state of exhaustion of a battery at any time, regardless of the type of load connected to the battery.

Objects and advantages of the present invention are achieved with a battery check device including a voltage detection device which detects the output voltage of a camera battery, a drive detection device which detects the time required to drive a camera mechanism, a memory to store the time detected by the drive detection device, a calculating device which assesses a degree of exhaustion of the battery based on the battery voltage detected by the voltage detection device and the time detected by the drive detection device which has been stored in the memory, and a display to display the degree of exhaustion of the battery assessed by the calculating device.

The memory of the battery check device in accordance with embodiments of the present invention is a non-volatile memory which retains its contents when the main power supply of the camera is cut off.

The battery check device in accordance with embodiments of the present invention also includes an initialization device which initializes the time stored in the memory if, at the time the power supply is switched ON, the battery voltage detected by voltage detection device is greater than or equal to a predetermined voltage value sufficient for driving camera mechanisms.

The calculating device of the battery check device in accordance with embodiments of the present invention includes a voltage discrimination device to classify the battery voltage. In particular, the voltage discrimination device receives the battery voltage detected by the voltage detection device and classifies the detected battery voltage in order of decreasing magnitude of the detected voltage into one of three (3) stages including a "normal" stage, a "warning" stage and a "use impossible" stage. The calculating device also includes a class change device which receives the result of the classification by the voltage discrimination device and, when the result of classification is the normal stage and the time recorded in the memory is greater than or equal to a predetermined standard time, changes the classification to the warning stage. The display receives the result of classification from the class change device, and displays the appropriate one of the three classification stages.

The drive detection device of the battery check device in accordance with embodiments of the present invention detects the time required to drive a camera mechanism, for example, the time required to drive a motor which raises a mirror. The amount of electric power provided to the camera mechanism from the battery is estimated according to the relative length of the time required to drive the mechanism. Specifically, because the amount of movement provided to the camera mechanism is set, the operating speed of the mechanism can be assessed. The memory stores the result of detecting the time required to drive the camera mechanism.

The calculating device assesses a degree of exhaustion of the battery based on a predetermined relationship between the detected time required to drive the camera mechanism and the detected battery output voltage. Accordingly, by reading out from the memory the result of the detected time required to drive the camera mechanism, the ability of the battery to provide electric power in the actual-state of use can be determined at any time.

Since the detection of the time required to drive the camera mechanism by the drive detection device is stored in a non-volatile memory, even when the main electrical supply of the camera is cut off, the result of the detection by the drive detection device is retained. Accordingly, because a previous result of detection by the drive detection device can be obtained from the non-volatile memory at a time when the power supply of the camera is switched ON, calculation and display of the degree of exhaustion of the battery can be immediately performed without waiting for the camera mechanism to be driven. Thus, at the time when the camera battery is inserted, a previous result of the detection of the time required to drive the camera mechanism is read from the memory, and degree of exhaustion of the battery is calculated.

However, when the battery is changed before switching ON of the power supply, because the detected time required to drive the camera mechanism for the former battery is stored in the memory, when the detected time for the former battery is long, a state of exhaustion of the battery would be assessed regardless of changing over to a new battery. Therefore, if the battery voltage which was detected at the time of switching the power supply ON is of a sufficient predetermined value to drive the camera mechanism, the initialization device assesses that the battery has been newly changed, and initializes the time stored in the non-volatile memory. By performing initialization by the initialization device, even when the battery has been changed just prior to switching the power supply ON, the degree of exhaustion of the battery can be accurately assessed and displayed.

When the voltage detection device classifies the detected voltage in the normal stage, it is possible that the battery is in a state of temporary recovery, resulting from, e.g., stopping usage of the battery for a period of time. Therefore, the class change device compares the detected time required to drive the camera mechanism with a predetermined standard time. When the time required to drive the camera mechanism exceeds the predetermined standard time, the class change device assesses that the battery is in an exhausted state, and changes the classification from the normal stage to the warning stage. Accordingly, by comparing the detected time required to drive the camera mechanism with the predetermined standard time, even when the battery voltage has temporarily recovered, the degree of exhaustion of the battery can be accurately assessed.

Further, because the time required to drive the camera mechanism is divided into two stages (i.e., less than the standard time and greater than or equal to the standard time), with the predetermined standard time as a threshold value, the assessment of the degree of exhaustion of the battery can be realized by a simple logic calculation.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
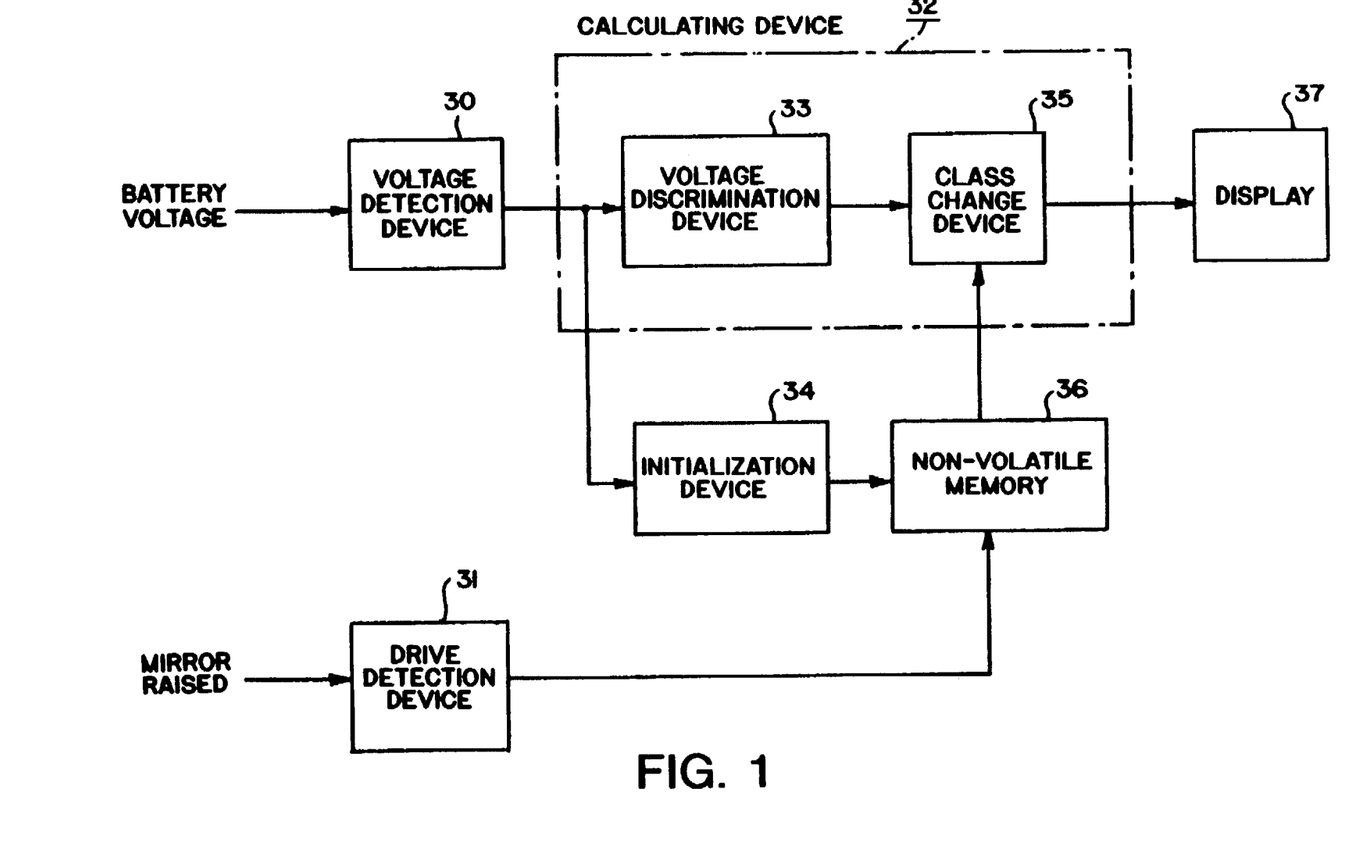
FIG. 1 is a block diagram showing a battery check device in accordance with embodiments of the present invention.
Figure 2:
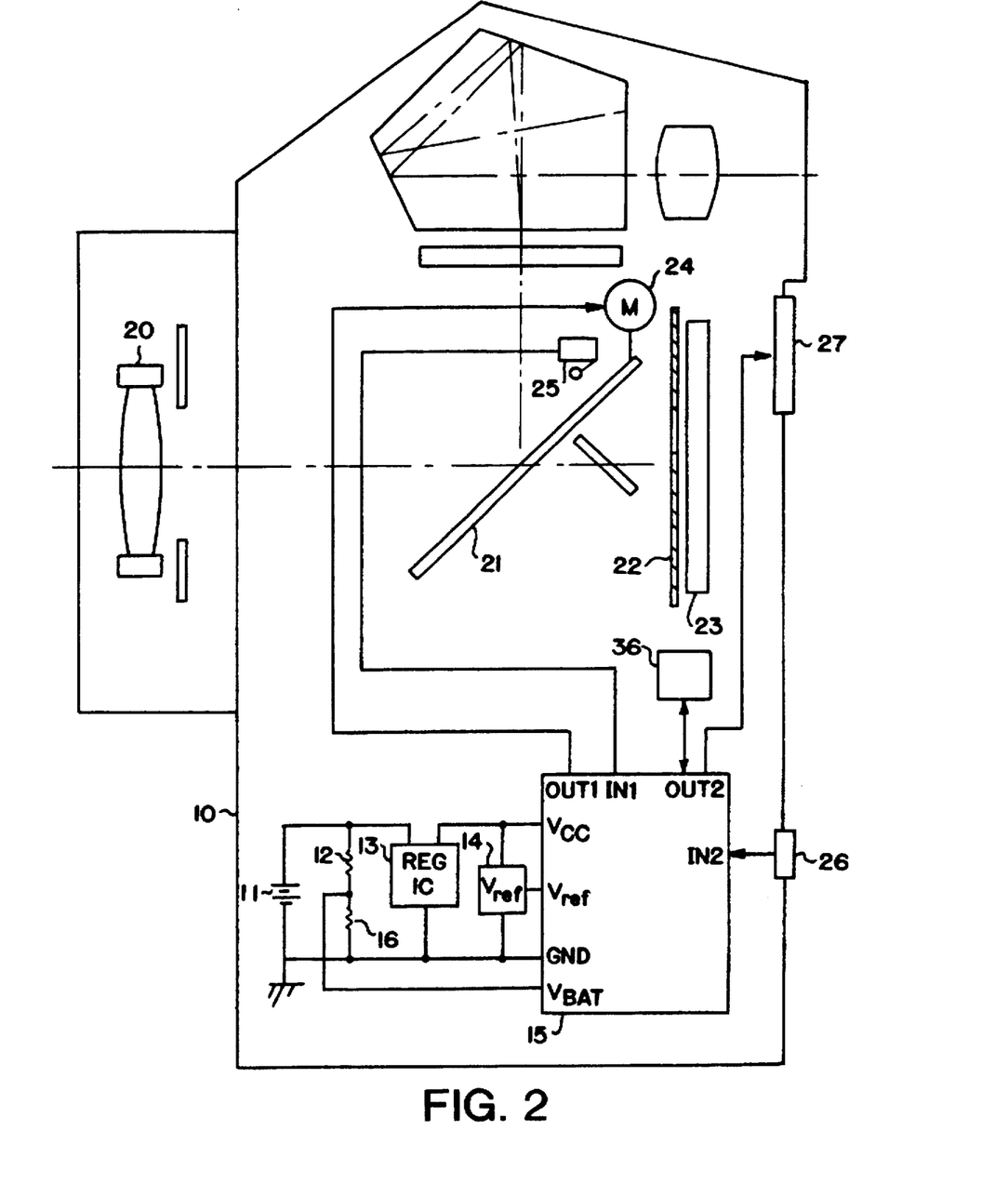
FIG. 2 is a side view of a camera having a battery check device in accordance with embodiments of the present invention.

A battery check device in accordance with embodiments of the present invention will first be described with reference to FIGS. 1 and 2. FIG. 1 is a block diagram showing the battery check device in accordance with embodiments of the present invention. FIG. 2 is side view of a camera having a battery check device in accordance with embodiments of the present invention. Referring to FIG. 2, a camera 10 having a battery check device in accordance with embodiments of the present invention is shown. The camera 10 includes a battery 11 which supplies power for performing camera operations.

One terminal of a resistor 12 and an input terminal of a constant voltage circuit 13 are connected to the anode of the battery 11. The supply terminal of a standard voltage circuit 14 and a supply terminal $V_{cc}$ of a microcomputer 15 are connected to an output terminal of the constant voltage circuit 13.

The output terminal of the standard voltage circuit 14 is connected to the standard voltage terminal $V_{ref}$ of the microcomputer 15, and the other terminal of the resistor 12 and one terminal of a resistor 16 are connected to a battery voltage input terminal VBAT of the microcomputer 15. Further, the cathode of the battery 11 is connected to the other terminal of the resistor 16 and to respective ground terminals of the constant voltage circuit 13, the standard voltage circuit 14, and the microcomputer 15.

As shown in FIG. 2, the camera 10 also includes a mirror 21, a shutter 22, and an imaging surface 23, such as a film, positioned sequentially on the optical axis of a photographic lens 20. A first output terminal OUT1 of the microcomputer 15 is connected to a control terminal of a sequence motor 24 which drives the mirror 21. A first input terminal IN1 of the microcomputer 15 is connected to an output terminal of a sequence switch 25 having contact points which are closed by the raising of the mirror 21. A second output terminal OUT2 of the microcomputer 15 is connected to a display unit 27 located in the camera 10.

The camera 10 also includes an electrical supply switch 26 connected to a second input terminal IN2 of the microcomputer 15, and a non-volatile memory 36 connected to the microcomputer 15.

Referring to FIG. 1, the operation of the battery check device in accordance with embodiments of the present invention will be described. A battery voltage from the battery 11 is provided to a voltage detection device 30 which detects an output voltage of the battery 11. The output voltage of the battery detected by the voltage detection device 30 is input to a voltage discrimination device 33 which classifies the detected battery voltage in order of magnitude of the detected voltage into one of three stages, a "normal" stage, a "warning" stage and a "use impossible" stage. A drive detection device 31 detects a time required to drive a camera mechanism and stores the detected time required to drive the camera mechanism in a non-volatile memory 36. An initialization device 34 is also connected to the voltage detection device 30. The initialization device receives the output of the voltage detection device 30 and, if at the time a power supply of the camera is turned ON, the battery voltage detected by the voltage detection drive 30 is greater than or equal to a predetermined value sufficient for drive of the camera mechanism, the initialization device initializes the time stored in the non-volatile memory. A class change device 35 is connected to the voltage discrimination device 33, and receives both the result of classification by the voltage discrimination device 33 and the time stored in the non-volatile memory 36, and, when the result of the classification is the "normal" stage and the time stored in the non-volatile memory 36 is greater than or equal to a predetermined standard time, changes the classification to the "warning" stage. A display 37 connected to the class change device 35 displays one of the three classification stages output by the class change device 37.

The voltage discrimination device 33 and the class change device 35 together operate as a calculating device 32 to assess a degree of exhaustion of the battery according to the battery voltage detected by the voltage detection device and the time detected by the drive detection device 31.

Figure 3:
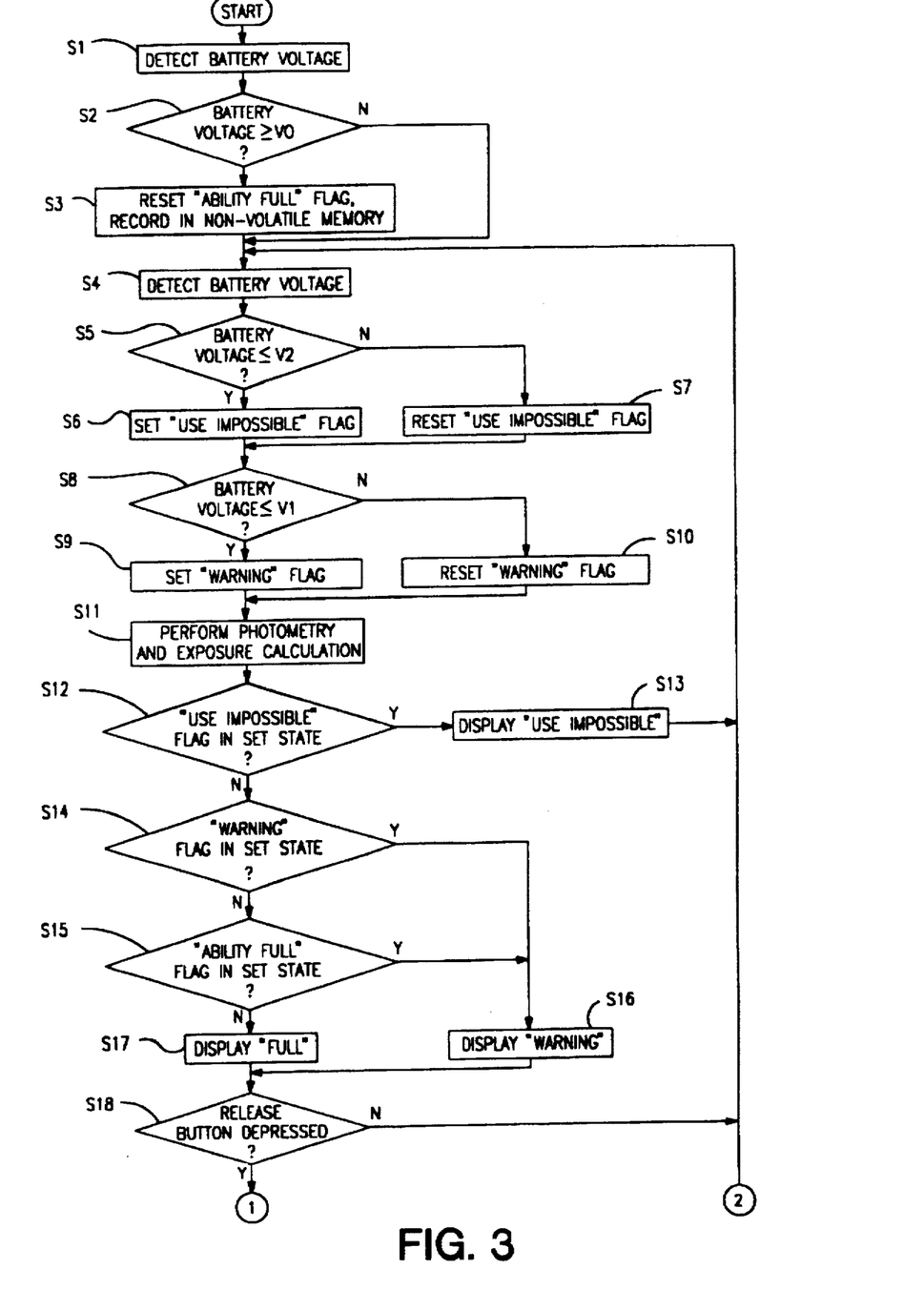
FIG. 3 is a flow chart showing an operational process for performing a battery check with a battery check device in accordance with embodiments of the present invention.
Figure 4:
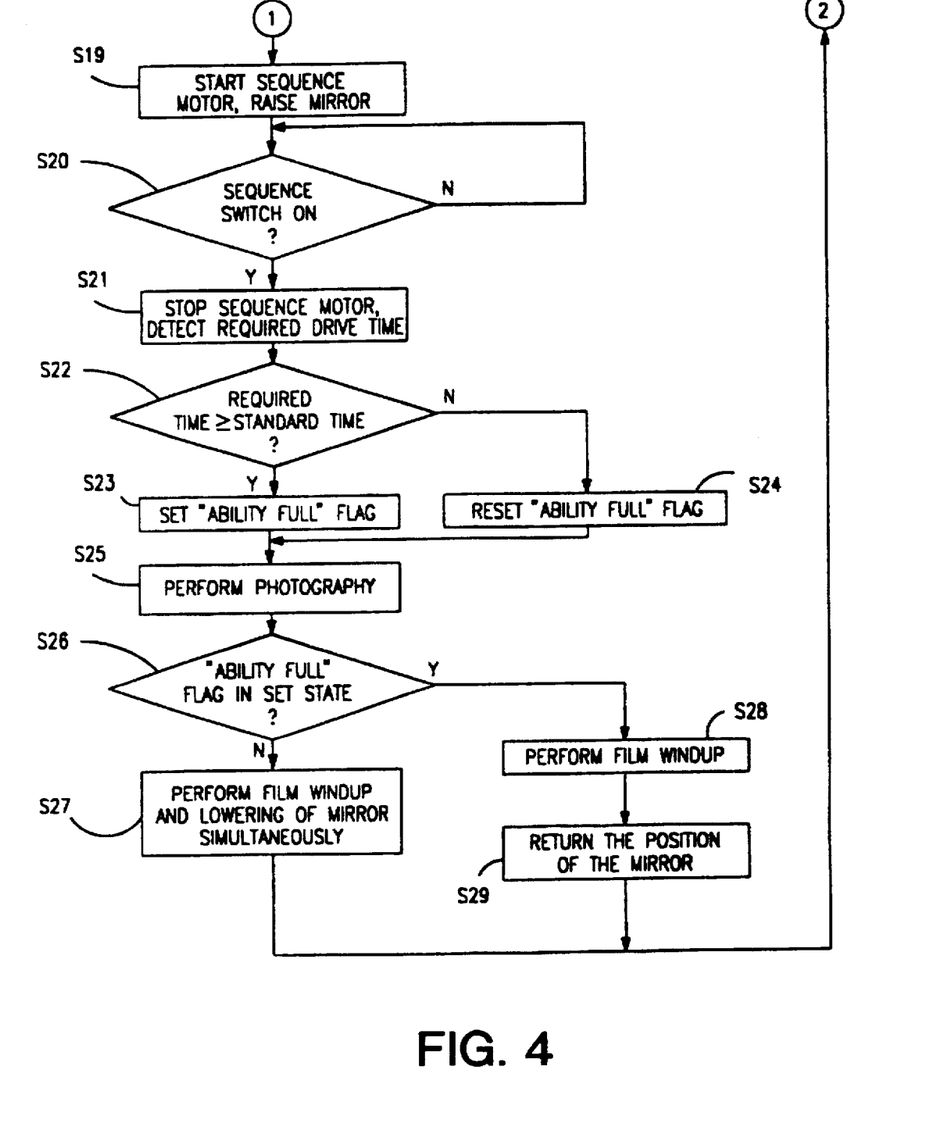
FIG. 4 is a flow chart showing an operational process for performing a battery check with a battery check device in accordance with embodiments of the present invention.

FIGS. 3 and 4 are flow charts showing an operational process for performing a battery check in accordance with embodiments of the present invention.

The battery voltage Va of the battery 11 is supplied, via the constant voltage circuit 13, to the respective power supply terminals of the microcomputer 15 and to the standard voltage circuit 14. Further, the battery voltage Va of the battery 11, divided by the resistors 12 and 16, is impressed on the battery voltage input terminal VBAT of the microcomputer 15. A standard voltage is input to the standard voltage terminal $V_{ref}$ of the microcomputer 15 by the standard voltage circuit 14, and is used as a standard voltage of A/D converters and the like within the microcomputer 15.

When the power supply switch 26 is set ON, the camera 10 is initialized by the initialization device 34. Specifically, the microcomputer 15 performs detection of the battery voltage Va (step S1) by A/D conversion of the voltage impressed on the battery voltage input terminal $V_{BAT}$. If the battery voltage Va is greater than or equal to a voltage value V0 (step S2) which is sufficient for the drive of the camera mechanism, an "ability full" flag stored in the non-volatile memory 36 is reset (step S3), thereby initializing the classification of the battery 11.

Next, the battery voltage is classified. In particular, the battery voltage Va is detected (step S4) and if the battery voltage Va is less than or equal to a voltage V2 which cannot drive the camera mechanism (step S5), a "use impossible" flag, recorded in the microcomputer 15 is set (step S6). When the battery voltage is not less than or equal to the voltage V2, the "use impossible" flag is, reset (step S7). If the battery voltage Va is less than or equal to a voltage V1 which warns of exhaustion of the battery (step S8), a "warning" flag recorded in the microcomputer 15 is set (step S9). When the battery voltage Va is not less than or equal to the voltage V1, the "warning" flag is reset (step S10). Accordingly, a classification of the battery voltage Va is performed in the manner described with respect to steps S2–S10 above.

Figure 5A:
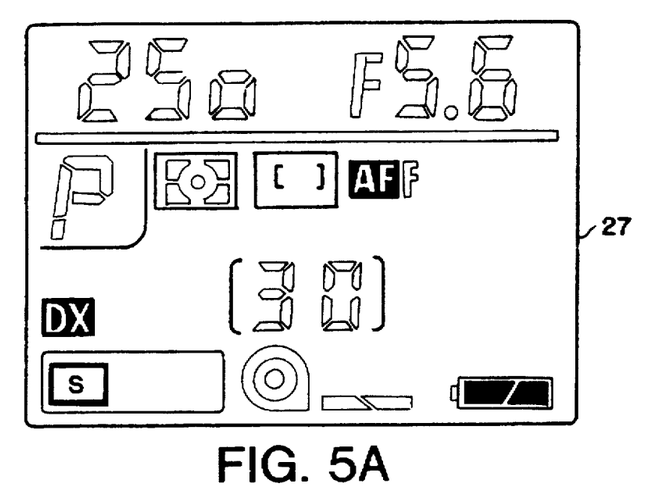
FIGS. 5A and 5B show a display in accordance with embodiments of the present invention.
Figure 5B:
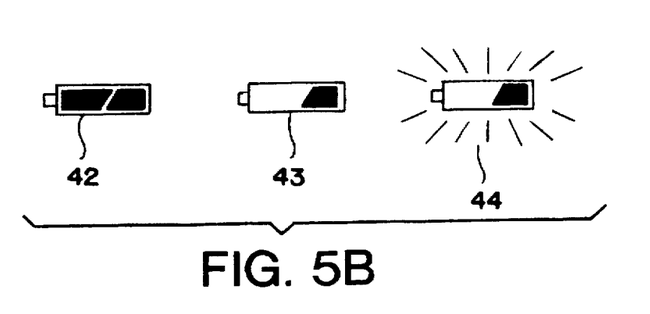

Photometry and exposure calculation for the subject are then performed by the camera 10 (step S11). If the "use impossible" flag is set (step S12), a "use impossible" display (flashing display) 44 is performed, as shown in FIG. 5B, warning that the battery has expired (step 13). The operational process then returns to step S4, reiterating the "use impossible" display 44.

Continuing, if either the "ability full" flag or the "warning" flag are in the set state (steps S14, S15), a "warning" display 43 is performed (step S16) by the display unit 27, to warn that the battery is in an exhausted state. Moreover, if both the "ability full" flag and the "warning" flag are in the reset state (steps S14, S15), a "full" display 42 is performed (step S17) by the display unit 27. A class change operation and a display of the classification of battery voltage are realized in the manner described with respect to steps S12–S17.

When a release button (not shown) is depressed (step S18), the sequence motor 24 starts the operation of raising of the mirror 21 (step S19). A time required to raise the mirror 21 is detected by the sequence switch 25. Specifically, when the mirror 21 is fully raised it closes the contacts of the sequence switch 25 placing sequence switch in an ON state (step S20), stopping the sequence motor 24 and allowing detection of the time required to drive the sequence motor 24 (step S21).

If the detected time Tb required to drive the sequence motor 24 is greater than or equal to a predetermined standard time Tr (step S22), the "ability full" flag recorded in the non-volatile memory 36 is set (step S23). When the detected time Tb required to drive the sequence motor 24 is less than the predetermined standard time Tr, the "ability full" flag is reset (step S24). Exposure of the film 23 is then performed (step S25) by opening and closing the shutter 22.

After the end of the exposure operation, if it is determined whether the "ability full" flag is in the set state (step S26). If the "ability full" flag is in the set state, film windup and the lowering of the mirror 21 are performed separately (steps S28, S29), to save the amount of electric power used. On the other hand, if the "ability full" flag is in the reset state, film windup and mirror lowering are performed simultaneously in one step (step S27), and the time required for photography is shortened. The operational process then returns to step S4 and the above-described operations are reiterated.

In the above-described manner, the battery check device in accordance with embodiments of the present invention can determine the battery voltage and assess the degree of exhaustion of the battery by comparing the time required Tb for raising the mirror 21 to a standard value Tr. Accordingly, the degree of exhaustion of the battery can be accurately and realistically assessed in accordance with the use state of the camera.

Further, by storing the "ability full" flag in the non-volatile memory 36, because the value of the "ability full" flag recorded therein can be obtained, without waiting for the drive of the mirror 21 due to photography, the state of exhaustion of the battery can be immediately calculated and displayed.

Still further, by classifying the battery voltage into three (3) stages, and also by dividing the time required to drive the mirror into two (2) stages (i.e., less than the standard time and greater than or equal to the standard time), the degree of exhaustion of the battery can be assessed by simple logical operations.

Further, because the time required to drive the mirror is divided into two (2) stages with a standard value as a threshold, a one (1) bit memory space is sufficient to store the "ability full" flag disposed in the non-volatile memory 36, and the amount of non-volatile memory 36 required can be reduced.

Furthermore, by performing the initialization of the non-volatile memory 36 at the-time the power supply to the camera is turned ON, the degree of exhaustion of the battery can be accurately assessed and displayed even when the battery has been newly changed.

Although the embodiments of the present invention have been described as using a non-volatile memory to store information, the invention is not limited to a non-volatile memory and other types of memory can also be used. When other types of memory are used, a state of exhaustion of the battery is displayed at the time the power source is turned ON, and is assessed only with respect to the battery voltage. Further, in accordance with embodiments of the present invention, the contents of the non-volatile memory are preserved when no power is supplied to the non-volatile memory. However, a memory may be used which, when the main power supply of the camera has been cut off, is supplied by an auxiliary power supply and maintains its recorded contents.

Further, although embodiments of the present invention have been described with respect to a display 27 which displays the degree of exhaustion of the battery in three (3) stages, the invention is not limited to displaying the degree of exhaustion in three stages. For example, by dividing the battery voltage Va or the required time Tb into an optional number of stages, the degree of exhaustion of the battery can be divided into plural stages and displayed by setting the degree of exhaustion of the battery to correspond to a respective combination of battery voltage Va and required time Tb.

Although in accordance with embodiments of the present invention the time required for the raising of the mirror 21 is measured, the present invention is not limited to measuring the time required to raise the mirror 21, and the drive time of various camera mechanisms which are supplied power by the battery 11 may be measured.

Figure 6:
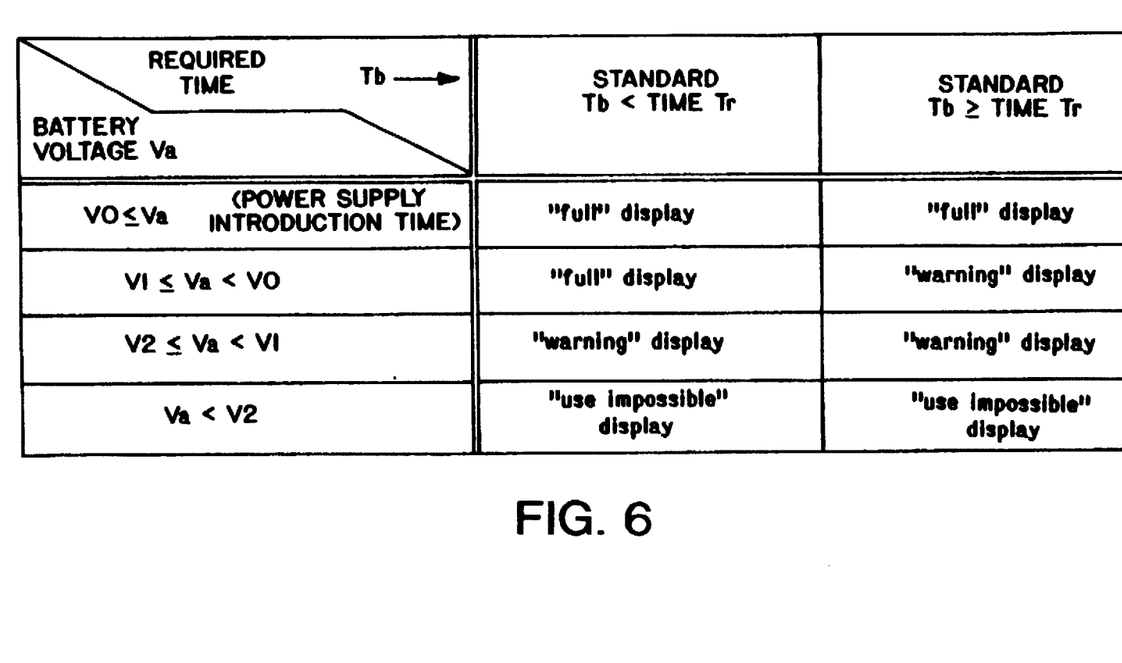
FIG. 6 is a chart showing the logical operations of the battery display in accordance with embodiments of the present invention.

Furthermore, although in accordance with embodiments of the present invention, the degree of exhaustion of the battery 11 is assessed using the microcomputer 15, according to the operational process shown in FIGS. 3 and 4, the operational process for assessing the state of exhaustion is the battery is not limited. For example, logical operations according to the corresponding relationships as shown in the table of FIG. 6 may be performed to assess the state of exhaustion of the battery. Moreover, in accordance with embodiments of the present invention, the degree of exhaustion of the battery 11 is displayed in the form of symbols; however, the display is not limited to symbols, and, for example, the display may be shown as a bar chart display or a pointer.

As described above, the battery check device in accordance with embodiments of the present invention assesses the degree of exhaustion of the battery by referencing the time required to drive a camera mechanism, such as the mirror 21, against predetermined standard times. Accordingly, the degree of exhaustion of the battery corresponding to the present state of use can be accurately and realistically found.

Further, by storing in non-volatile memory the result of detection of the time required to drive a camera mechanism, the degree of exhaustion of the battery can be calculated and displayed at any time. Accordingly, even when a power supply is first turned ON, the degree of exhaustion of the battery can be immediately assessed and displayed.

By performing initialization of the non-volatile memory at the time the power supply is turned ON, the degree of exhaustion of the battery can be accurately displayed, even in the case when the battery has been newly changed.

By classifying the battery voltage into three (3) stages, and also by dividing the time required to drive the camera mechanism into two (2) stages, the degree of exhaustion of the battery can be calculated by simple logical operations. Moreover, because the time required to drive a camera mechanism is divided into two (2) stages, the required time may be recorded in the non-volatile memory as a binary value, and the storage capacity of the memory can be saved.

In the above-described manner, in a camera in which the present invention is applied, the state of exhaustion of the battery can be accurately displayed at any time, and the photographer can suitably decide to change the battery or can accurately conserve the battery.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A battery check device for a camera comprising:

a voltage detection device to detect a voltage of a camera battery and to output a detected battery voltage;

a drive detection device to detect a time required to drive a camera mechanism;

a classification device to classify the battery voltage detected by the voltage detection device into one of a plurality of classifications indicating respective states of exhaustion of the battery; and a classification change device to change the classification of the detected battery voltage according to a relationship between the classification of the battery voltage by the classification device and the time detected by the drive detection device.

2. A battery check device as recited in claim 1, wherein the classification device classifies the detected battery voltage into one of a normal classification, a warning classification and a use impossible classification, and the classification change device changes the classification from the normal classification to the warning classification when the detected battery voltage is classified a normal classification and the time detected by the drive detection device is greater than or equal to a predetermined time.

3. A battery check device as recited in claim 1, further comprising:

a non-volatile memory to store a drive time indicating a time required to drive the camera mechanism; and an initialization device to initialize the drive time stored in the non-volatile memory when the battery voltage detected by the voltage detection device at a time camera power is switched on is greater than or equal to a predetermined voltage sufficient for driving the camera mechanism, wherein the classification change device changes the classification of the battery voltage according to the time stored in the non-volatile memory.

4. A battery check device as recited in claim 1, further comprising:

a non-volatile memory to store the time detected by the drive detection device when the camera power supply is off, wherein, when the camera power supply is switched on, the classification change device receives from the non-volatile memory the time required to drive the camera mechanism detected during a previous drive of the camera mechanism and assesses a degree of exhaustion of the battery using the previously detected drive time.

5. A battery check device as recited in claim 1, further comprising a display to display the state of exhaustion classified by the classification device and the classification change device.

6. A battery check device as recited in claim 1, wherein the classification device includes a voltage discrimination device to compare the battery voltage detected by the voltage detection device with a plurality of voltage values corresponding to a plurality of different states of exhaustion of the battery and to classify the detected battery voltage according to the result of the comparison.

7. A battery check device as recited in claim 1, wherein the drive detection device detects a time required to drive a mirror.

8. A battery check device as recited in claim 6, wherein the voltage discrimination device classifies the battery voltage by comparing the detected battery voltage with a voltage value which can not drive the camera mechanism and a voltage value indicating exhaustion of the battery.

9. A battery check device as recited in claim 5, wherein the display displays the degree of exhaustion of the battery in the form of symbols.

10. A battery check device for a camera, comprising:
a voltage detection device to detect a voltage of a camera battery and to output a detected battery voltage;
a drive detection device to detect a time required to drive a camera mechanism; and
a calculating device to assess a degree of exhaustion of the battery based on the voltage output by the voltage detection device and the timed detected by the drive detection device, the calculating device including
a voltage discrimination device to classify the battery voltage detected by the voltage detection device according to a degree of exhaustion of the battery, wherein the voltage discrimination device classifies the battery voltage into one of a normal classification, a warning classification, and a use impossible classification, and
a class change device which receives the result of the classification of the battery voltage by the voltage discrimination device and changes the classification received from the voltage discrimination device in accordance with the time detected by the drive detection device and the classification of the battery voltage by the voltage discrimination device, wherein the class change device changes the classification received from the voltage discrimination device from the normal classification to the warning classification when a normal classification is received and the time detected by the drive detection device is greater than or equal to a predetermined standard of time.

11. A battery check device for a camera, comprising:
a voltage detection device to detect a voltage of a camera battery and to output a detected battery voltage;
a drive detection device to detect a time required to drive a camera mechanism;
a non-volatile memory to store the time detected by the drive detection device;
a calculating device to assess a degree of exhaustion of the battery corresponding to the battery voltage output by the voltage detection device and the detected time stored in the non-volatile memory, the calculating device including
a voltage discrimination device to classify the battery voltage detected by the voltage detection device into a corresponding degree of exhaustion of the battery, the voltage discrimination device classifying the battery voltage into one of a normal classification, a warning classification and a use impossible classification, and
a class change device to change the classification of the battery voltage by the voltage discrimination device to a warning classification when the battery voltage is classified in the normal classification and the time stored in the non-volatile memory is greater than or equal to a predetermined standard time;
an initialization device to initialize the detected time stored in the non-volatile memory when the battery voltage detected by the voltage detection device at a time the camera power is switched on is greater than or equal to a predetermined voltage sufficient for driving the camera mechanism; and
a display to display the degree of exhaustion assessed by the calculating device.

12. A battery check device for a camera, comprising:
a voltage detection device to detect a voltage of a camera battery and to output a detected battery voltage;
a drive detection device to detect a time required to drive a camera mechanism;
a classification device to classify the battery voltage detected by the voltage detection device into one of a plurality of classifications indicating respective states of exhaustion of the battery; and
a classification change device to change a classification received from the classification device when the time detected by the drive detection device is greater than or equal to a predetermined time,
wherein the classification device classifies the detected battery voltage into one of a normal classification, a warning classification and a use impossible classification, and the classification change device changes the classification received from the classification device from the normal classification to the warning classification when a normal classification is received and the time detected by the drive detection device is greater than or equal to the standard time.

13. A battery check device as recited in claim 12, further comprising:
a non-volatile memory to store a drive time indicating a time required to drive the camera mechanism; and
an initialization device to initialize the drive time stored in the non-volatile memory when the battery voltage detected by the voltage detection device at a time camera power is switched on is greater than or equal to a predetermined voltage sufficient for driving the camera mechanism,
wherein the classification change device changes the classification of the battery voltage according to the time stored in the non-volatile memory.

14. A battery check device as recited in claim 12, further comprising:
a non-volatile memory to store the time detected by the drive detection device when the camera power supply is off,
wherein, when the camera power supply is switched on, the classification change device receives from the non-volatile memory the time required to drive the camera mechanism detected during a previous drive of the camera mechanism and assesses a degree of exhaustion of the battery using the previously detected drive time.

15. A battery check device as recited in claim 12, further comprising a display to display the state of exhaustion classified by the classification device and the classification change device.

16. A battery check device as recited in claim 12, wherein the classification device includes a voltage discrimination device to compare the battery voltage detected by the voltage detection device with a plurality of voltage values corresponding to a plurality of different states of exhaustion of the battery and to classify the detected battery voltage according to the result of the comparison.

17. A battery check device as recited in claim 12, wherein the drive detection device detects a time required to drive a mirror.

18. A battery check device as recited in claim 16, wherein the voltage discrimination device classifies the battery voltage by comparing the detected battery voltage with a voltage value which can not drive the camera mechanism and a voltage value indicating exhaustion of the battery.

19. A battery check device as recited in claim 15, wherein the display displays the degree of exhaustion of the battery in the form of symbols.

20. A battery check device for a camera, comprising:

a voltage detection device to detect a voltage of a camera battery and to output a detected battery voltage;

a drive detection device to detect a time required to drive a camera mirror;

a classification device to classify the battery voltage detected by the voltage detection device into one of a plurality of classifications indicating respective states of exhaustion of the battery; and a classification change device to change a classification received from the classification device when the time detected by the drive detection device is greater than or equal to a predetermined time.

21. A battery check device as recited in claim 20, wherein the classification device classifies the detected battery voltage into one of a normal classification, a warning classification and a use impossible classification, and the classification change device changes the classification received from the classification device from the normal classification to the warning classification when a normal classification is received and the time detected by the drive detection device is greater than or equal to the standard time.

22. A battery check device as recited in claim 20, further comprising:

a non-volatile memory to store a drive time indicating a time required to drive the camera mirror; and an initialization device to initialize the drive time stored in the non-volatile memory when the battery voltage detected by the voltage detection device at a time camera power is switched on is greater than or equal to a predetermined voltage sufficient for driving the camera mirror, wherein the classification change device changes the classification of the battery voltage according to the time stored in the non-volatile memory.

23. A battery check device as recited in claim 20, further comprising:

a non-volatile memory to store the time detected by the drive detection device when the camera power supply is off, wherein, when the camera power supply is switched on, the classification change device receives from the non-volatile memory the time required to drive the camera mirror detected during a previous drive of the camera mirror and assesses a degree of exhaustion of the battery using the previously detected drive time.

24. A battery check device as recited in claim 20, further comprising a display to display the state of exhaustion classified by the classification device and the classification change device.

25. A battery check device as recited in claim 20, wherein the classification device includes a voltage discrimination device to compare the battery voltage detected by the voltage detection device with a plurality of voltage values corresponding to a plurality of different states of exhaustion of the battery and to classify the detected battery voltage according to the result of the comparison.

26. A battery check device as recited in claim 25, wherein the voltage discrimination device classifies the battery voltage by comparing the detected battery voltage with a voltage value which can not drive the camera mechanism and a voltage value indicating exhaustion of the battery.

27. A battery check device as recited in claim 24, wherein the display displays the degree of exhaustion of the battery in the form of symbols.

* * * * *